Figure 3:
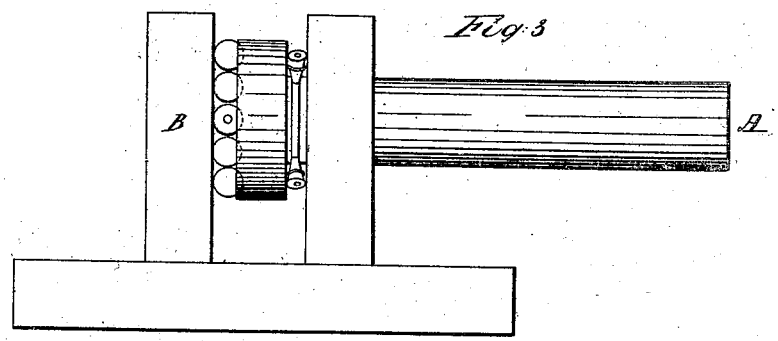

No. 29,570.  
PATENTED AUG. 14, 1860.

D. S. CHASE.
ANTIFRICTION ROLLER FOR PROPELLER SHAFTS.

Witnesses  
G. B. Sowles  
C. J. Smith

Inventor  
D. S. Chase  
by his attorney  
A. Tho. Smith

UNITED STATES PATENT OFFICE.

DANIEL S. CHASE, OF AUGUSTA, GEORGIA.

IMPROVED ANTI-FRICTION ROLLER FOR PROPELLER-SHAFTS.

Specification forming part of Letters Patent No. 29,570, dated August 14, 1860.

*To all whom it may concern:*

Be it known that I, DANIEL S. CHASE, of Augusta, in the county of Richmond and State of Georgia, have invented a new and Improved Anti-Friction Propeller-Shaft; and I do hereby declare that the following is a full and exact description thereof, reference being had to the accompanying drawings, and to the letters of reference marked thereon.

The nature of my invention consists in the use of balls upon axles or arms attached to a ring fitting the shaft loosely, so as to move around it, the balls running in grooves in the disk or permanent collar of the shaft, also in similar grooves, or upon plain surfaces in the step or resisting portion to the weight or pressure applied in a longitudinal direction, for the purpose of overcoming, as much as possible, the abrasion or friction consequent on the usual methods of resisting the end-thrust of shafting. In this combination four shaft-bearings or arms are employed, which are secured upon the ring moving upon the shaft, so that the arms or axles radiate in a line with the center of the shaft in each direction. Upon each of these axles one ball or more is placed and allowed to move freely. Recesses or grooves are made in the disk or permanent collar of the shaft A, exactly suiting the arc or section of the circumferences of the balls intended to move in the said grooves or recesses. One object of the grooves or recesses in the said disk is to keep the balls, while the shaft is revolving, at a given radius without the abrasion consequent on the use of linchpins or other devices. Another object is the greater amount of bearing-surface obtained. The step plate or piece B, which is meant to receive the pressure or weight while the shaft A is in action, had also better be grooved like the disk or collar of the shaft A; but either or both may be grooved, or either or both may have plain surfaces.

To enable others skilled in the art to make and use my invention, I will state that the balls to be employed are to be made of hard cast iron or steel, or other suitable metal, of such quality as not to be essentially impaired by their action. These balls may be cast with a cavity surrounding the axle portion of them, the object of which is to avoid unnecessary weight and yet retain sufficient strength to resist the crushing tendency. The balls may be eight, ten, or more inches in diameter, or of any convenient size, and are to be turned each of equal diameter of spherical form, though this form may be varied a little without much disadvantage, bearing in mind that they conform to the groove in the said collar or disk.

The collar or disk of the shaft A may be, say, four feet in diameter, more or less, and upon its face or thickness about ten inches, and made of such metal as will, without injury from friction of the balls, be of sufficient hardness. The object of this combination and arrangement is to avoid friction from the rotation and pressure upon the shaft. So far as securing the shaft in its proper bearings and the step or resisting plate B are concerned, the usual methods and adaptation of ordinary means may be employed.

A similar arrangement of balls and grooves may be made on the opposite side of the disk or permanent collar on the shaft A, the balls moving between it and the second collar, through which the shaft A passes. The object of this is to receive the backward thrust of the propeller-shaft A when its action is reversed.

Figure 2:
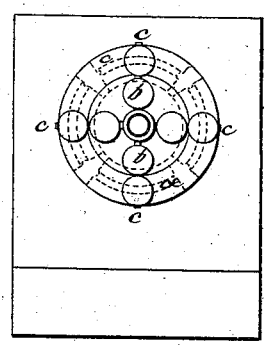
Figure 1:
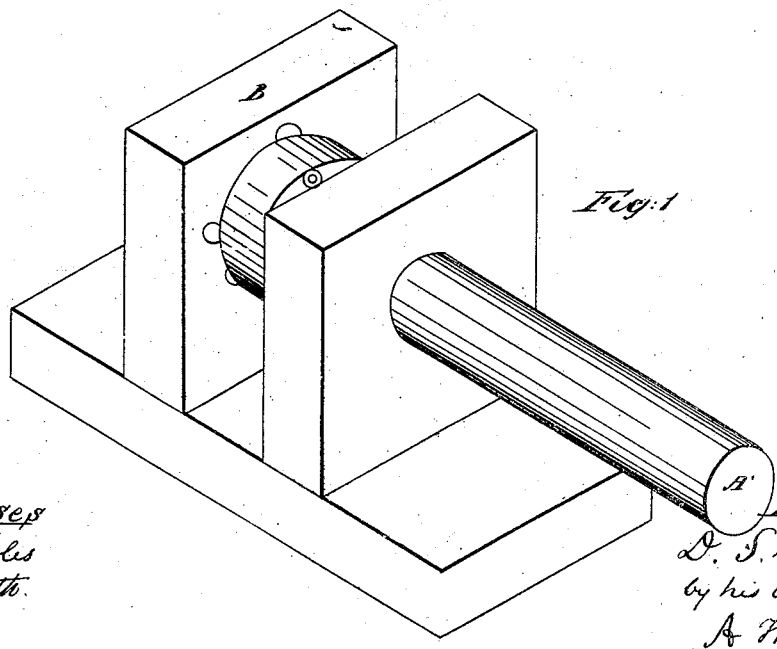

Figure 1 is a perspective or general view of my anti-friction propeller-shaft. Fig. 2 is an end view of the collar or disk of the shaft A, with its grooves or recesses *a a*, and balls *b b*, with their arms or axles *c c*, as placed for action. Fig. 3 is a longitudinal view of said shaft, collar, and balls.

I am aware that various devices have been used which were intended to reduce the friction from the weight of vertical shafts and their appendages and horizontal shafts used in propelling steam-vessels. Among these have been conical rollers, ranging in radial lines from the center of the shaft; also, that collars upon the shaft, with corresponding recesses in boxes, have been introduced.

I do not claim conical frictionless rollers, they having been heretofore used.

What I claim as my invention, and desire to secure by Letters Patent, is—

The combined use of the two sets of anti-friction rollers, constructed substantially as described, one set on each side of the disk or collar of the shaft.

DANIEL S. CHASE.

Witnesses:
H. T. CAMPFIELD,
CORNELIUS WISE.